(12) United States Patent
Alu

(10) Patent No.: US 9,851,162 B2
(45) Date of Patent: Dec. 26, 2017

(54) COVER FOR HEAT SOURCE

(71) Applicant: AIR INTERNATIONAL (US) INC., Auburn Hills, MI (US)

(72) Inventor: Calogero Alu, Shelby Township, MI (US)

(73) Assignee: Air International, Inc., Auburn Hills, MI (US)

( * ) Notice: Subject to any disclaimer, the term of this patent is extended or adjusted under 35 U.S.C. 154(b) by 243 days.

(21) Appl. No.: 14/818,440

(22) Filed: Aug. 5, 2015

(65) Prior Publication Data
US 2016/0040944 A1 Feb. 11, 2016

Related U.S. Application Data

(60) Provisional application No. 62/033,395, filed on Aug. 5, 2014.

(51) Int. Cl.
| F16L 57/00 | (2006.01) |
| F28F 27/00 | (2006.01) |
| F28F 9/02 | (2006.01) |
| F16H 57/04 | (2010.01) |
| F16L 57/04 | (2006.01) |
| F28D 21/00 | (2006.01) |

(52) U.S. Cl.
CPC ......... *F28F 27/00* (2013.01); *F16H 57/0416* (2013.01); *F28F 9/0246* (2013.01); *F16L 57/04* (2013.01); *F28D 2021/0089* (2013.01); *F28F 2265/10* (2013.01); *F28F 2275/085* (2013.01)

(58) Field of Classification Search
CPC ............. F10N 7/10; F10N 13/14; F16L 57/00

USPC .......... 138/110, 106; 60/323, 322, 272, 312, 60/320; 123/184.21, 195 C; 180/309; 181/243

See application file for complete search history.

(56) References Cited

U.S. PATENT DOCUMENTS

| 5,474,123 A * | 12/1995 | Buckshaw | F28F 19/002 138/110 |
| 6,438,949 B1 * | 8/2002 | Nozaki | B60K 13/04 123/184.21 |
| 6,598,389 B2 * | 7/2003 | Chen | F01N 13/102 123/169 PH |
| 7,263,827 B2 * | 9/2007 | Oshima | F01N 13/08 248/62 |
| 7,946,380 B2 * | 5/2011 | Yamamoto | F01N 13/14 181/204 |
| 9,512,771 B2 * | 12/2016 | Mahira | F01N 13/085 |
| 2004/0083714 A1 * | 5/2004 | Tsuruta | F01N 13/14 60/272 |
| 2008/0098721 A1 * | 5/2008 | Liu | F01N 13/14 60/272 |
| 2008/0146138 A1 | 6/2008 | Sikorski | |
| 2012/0261022 A1 * | 10/2012 | Junior | F04B 39/06 138/147 |
| 2014/0119824 A1 | 5/2014 | Hoehn | |

* cited by examiner

*Primary Examiner* — Patrick F Brinson
(74) *Attorney, Agent, or Firm* — Carlson, Gaskey & Olds, P.C.

(57) ABSTRACT

A cover for a heat source according to an exemplary aspect of the present disclosure includes, among other things, a first portion covering at least a portion of the heat source, and a second portion including a first latch and a second latch. Each of the first and second latches are configured to engage a fluid conduit. An assembly is also disclosed.

13 Claims, 6 Drawing Sheets

COVER FOR HEAT SOURCE

RELATED APPLICATION(S)

This application claims the benefit of U.S. Provisional Application No. 62/033,395, filed Aug. 5, 2014, the entirety of which is herein incorporated by reference

BACKGROUND

Modern vehicles include heating, ventilation, and air conditioning (HVAC) systems for improving passenger comfort.

In general, vehicle air conditioning systems include an evaporator heat exchanger in communication with a compressor and a condenser. A compressor receives heated refrigerant from the evaporator and compresses it into a high pressure gas for communication to the condenser. The condenser then cools the gaseous refrigerant into a cool liquid refrigerant for communication back to the evaporator. A blower forces air across the evaporator, providing cooled air into the passenger compartment.

A vehicle heating system includes a heater core that receives hot engine coolant from the engine. A blower forces air across the heater core, providing heated air to the passenger compartment. The system may include one or more conduits carrying relatively hot fluid.

SUMMARY

A cover for a heat source according to an exemplary aspect of the present disclosure includes, among other things, a first portion covering at least a portion of the heat source, and a second portion including a first latch and a second latch. Each of the first and second latches are configured to engage a fluid conduit.

An assembly according to an exemplary aspect of the present disclosure includes, among other things, at least one fluid conduit, a heat source fluidly coupled to the at least one fluid conduit, and a cover. The cover includes a first portion covering at least a portion of the heat source, and a second portion including a first latch and a second latch. Each of the first and second latches are configured to engage the at least one fluid conduit.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
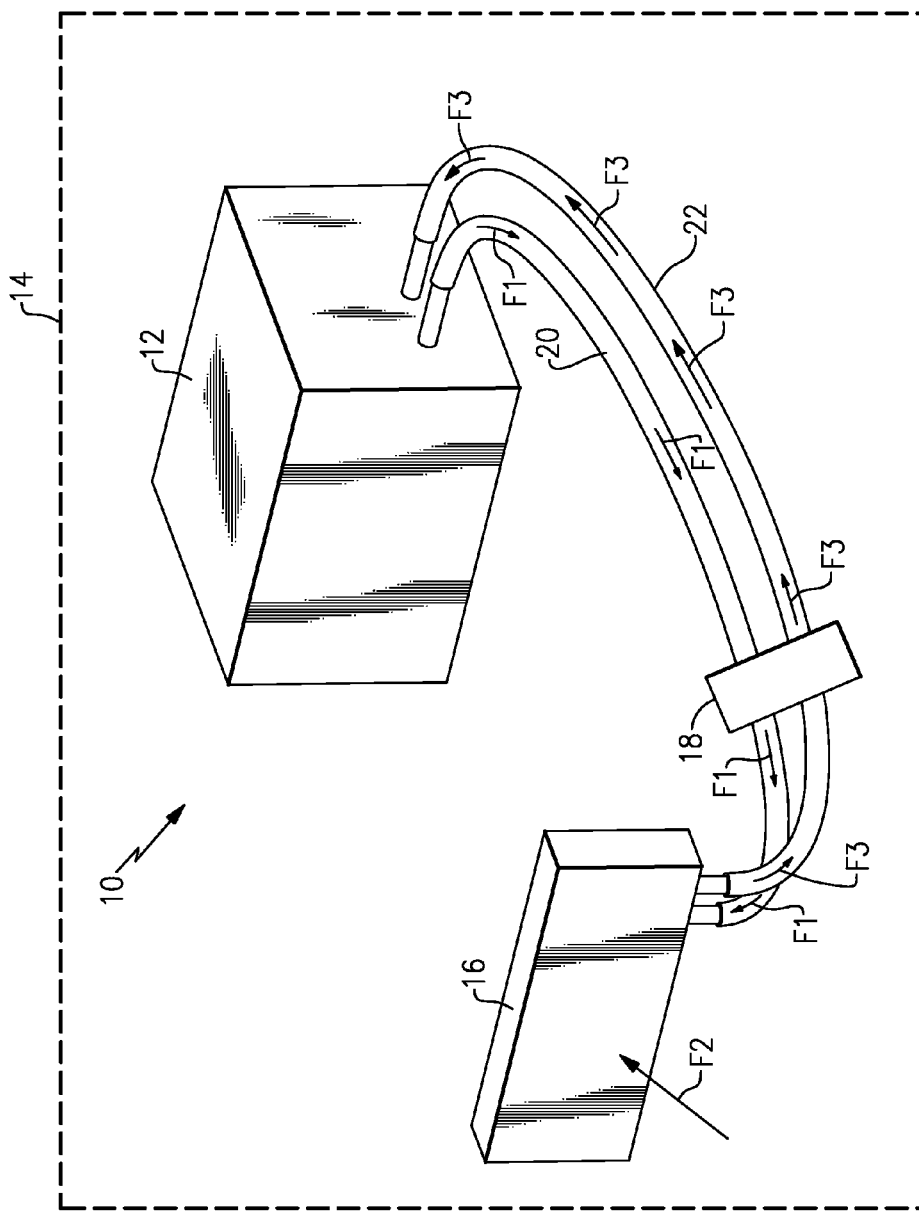
FIG. 1 schematically illustrates a vehicle system.

FIG. 1 illustrates a vehicle system 10 for thermally managing a heat source 12 of a vehicle 14. The heat source 12 could be an engine, a transmission, or any other heat generating component of the vehicle 14. The heat source 12 generates heat during operation of the vehicle 14 and therefore may need to be cooled during some conditions.

In one embodiment, the vehicle system 10 includes a heat exchanger 16 and a thermal bypass valve (TBV) 18. A TBV 18 need not be present in all examples. A supply conduit 20 and a return conduit 22 connect the components of the vehicle system 10 in a closed circuit.

In one non-limiting embodiment, the heat exchanger 16 is a transmission oil cooler configured as an air/oil heat exchanger. Other types of heat exchangers are also contemplated within the scope of this disclosure, including but not limited to, engine oil coolers or hydraulic fluid oil coolers. In addition, the heat exchanger 16 may exchange heat between any two different fluid exchange medium.

The TBV 18 can be actuated to bypass the heat exchanger 16 under certain temperature conditions if the heat transfer function of the heat exchanger 16 is not required. In one embodiment, the TBV 18 is a multi-port bypass valve. The vehicle system 10 may employ any suitable bypass valve for selectively bypassing the functionality of the heat exchanger 16.

The vehicle system 10 may communicate a fluid F1 in the closed circuit. For example, the fluid F1, which is relatively hot, is communicated from the heat source 12 to the heat exchanger 16 via the supply conduit 20. The fluid F1 may circulate through the heat exchanger 16 to exchange heat with another fluid F2, such as airflow, to provide a cooled fluid F3. The fluid F2 may be communicated across the heat exchanger 16 with or without the use of a fan to exchange heat with the fluid F1. After exchanging heat with the fluid F2, the fluid F1 is returned to the heat source 12 as cooled fluid F3 via a return conduit 22 to thermally manage (i.e., heat or cool) the heat source 12.

Figure 2:
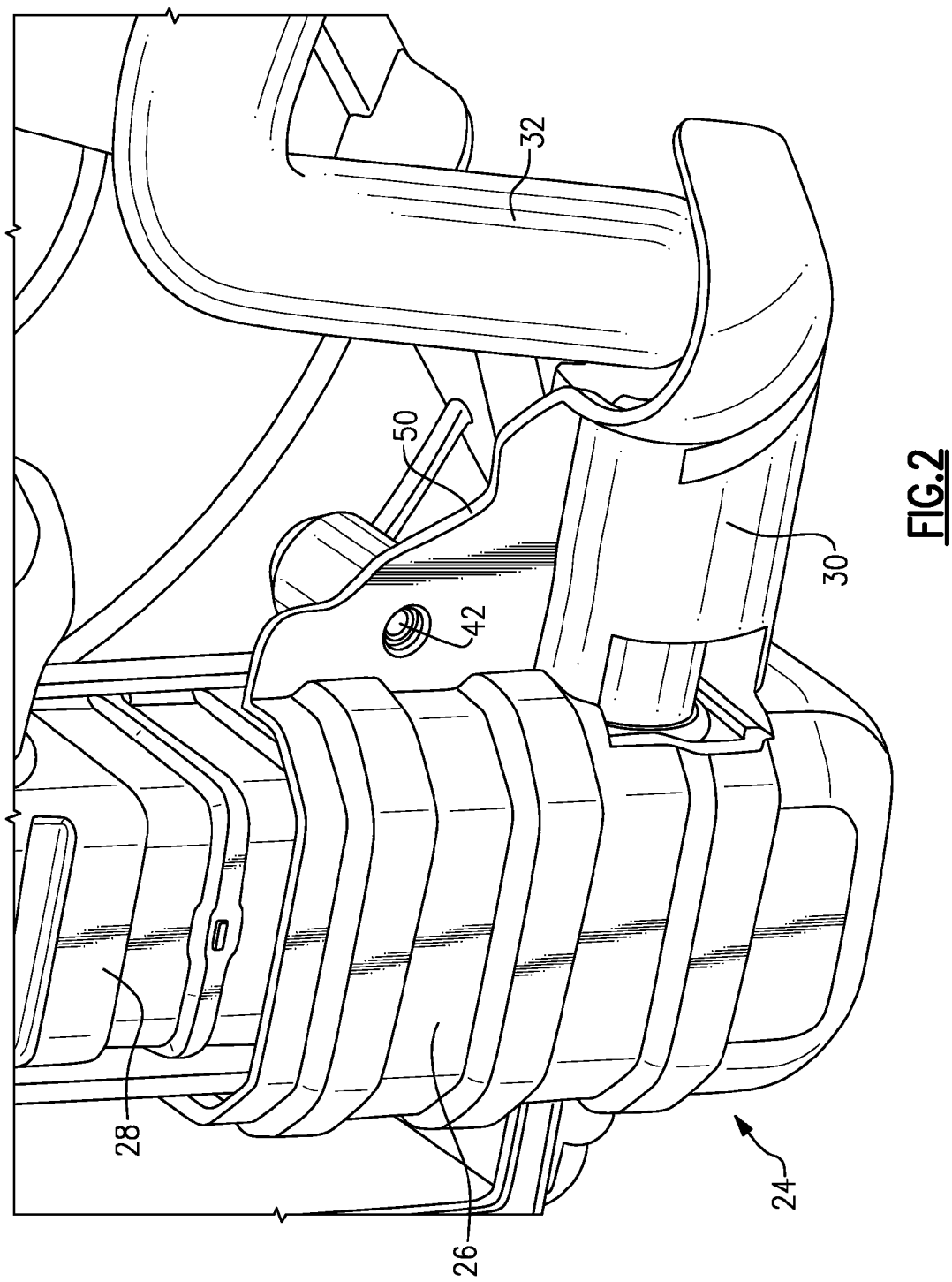
FIG. 2 illustrates a heater cover according to this disclosure.

FIG. 2 illustrates a cover 24 according to this disclosure. The cover 24 includes a first portion 26 configured to cover a heat source 28, which could be a portion of the heat source 12 or the heat exchanger 16 of FIG. 1. The cover 24 further includes a second portion 30 for covering and attaching to a conduit 32. The conduit 32 may be a portion of the supply conduit 20 or the return conduit 22.

Figure 3:
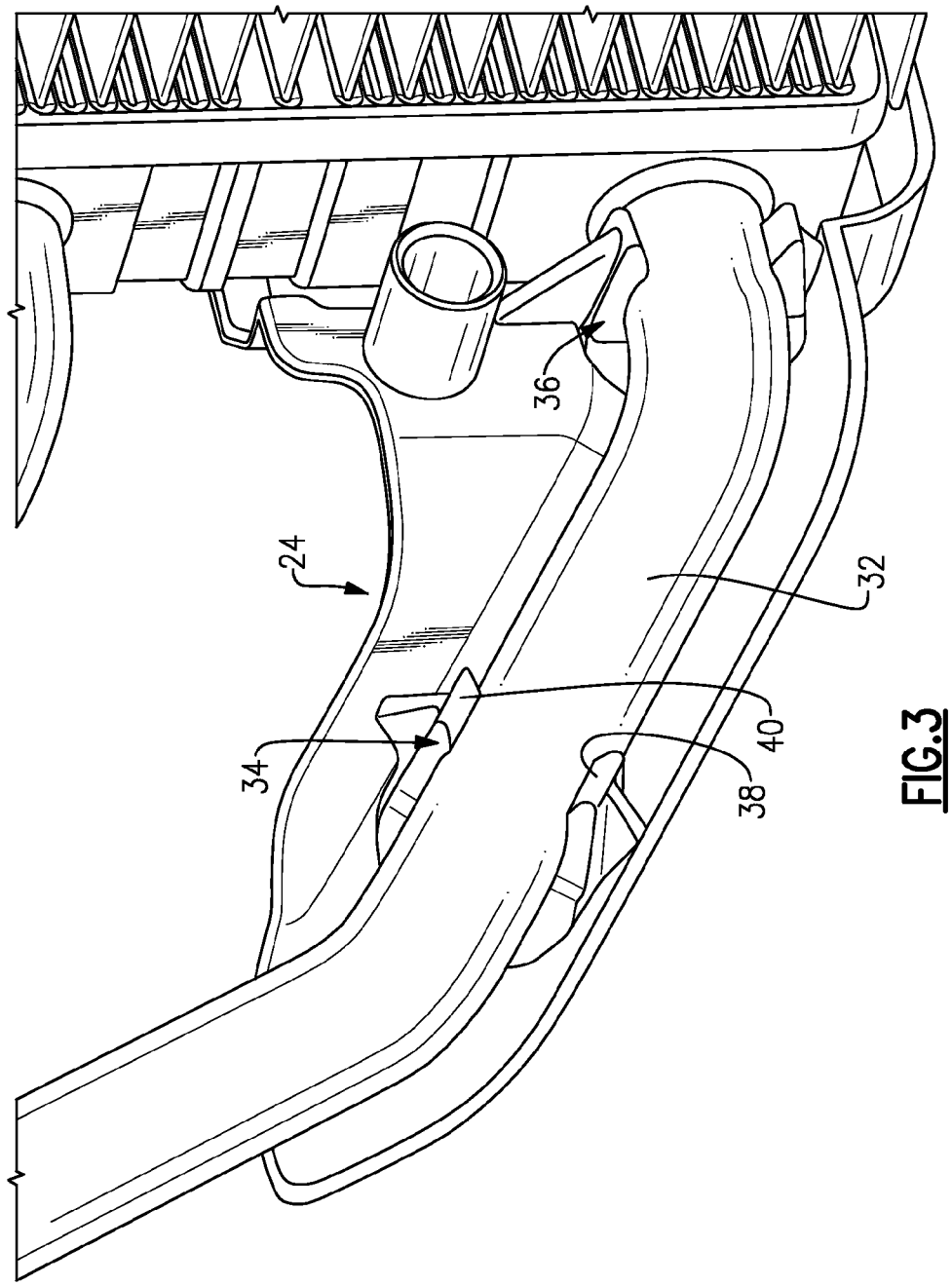
FIG. 3 is a rear view of the cover of FIG. 2.

FIG. 3 is a rear view of the cover 24. As illustrated, the second portion 30 includes first and second latches 34, 36 configured to essentially snap onto the conduit 32. In this example, the first and second latches 34, 36 are U-shaped channels having an inner contour corresponding to an outer contour of the conduit 32. Further, with reference to the first latch 34, the latches include first and second deflectable projections 38, 40, which are urged away from one another by the conduit 32 during assembly, and are biased toward the conduit 32 to retain the cover 24 in place.

Figure 5:
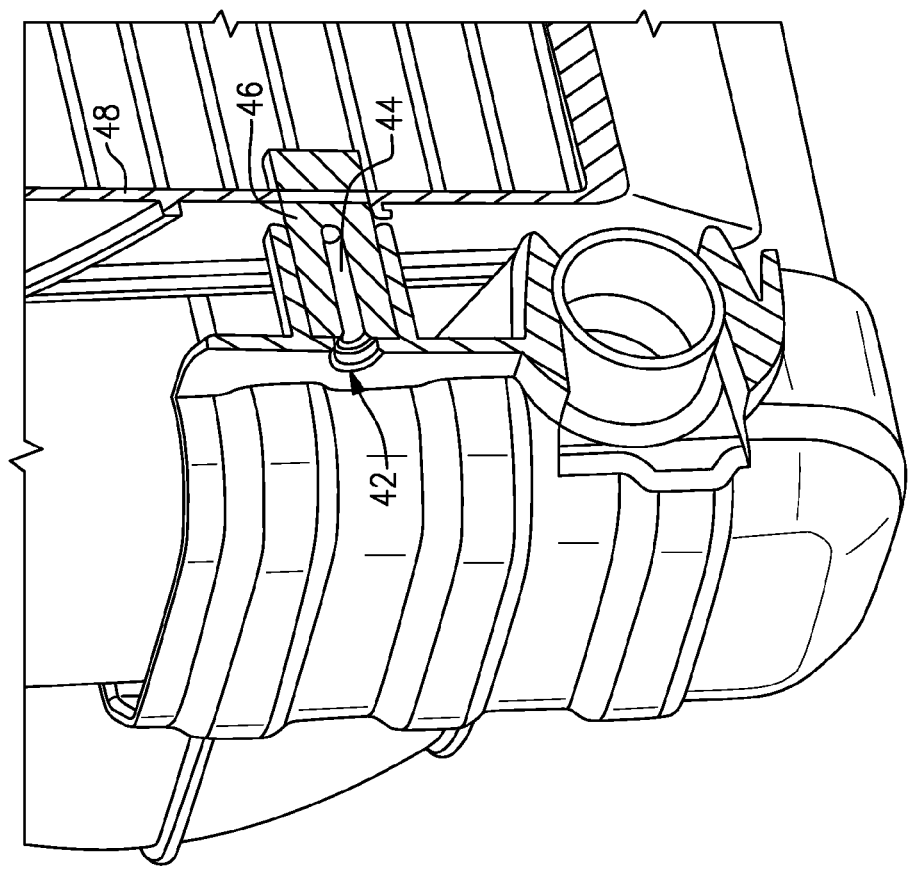
FIG. 5 is a cross-sectional view of the cover in assembled condition.
Figure 4:
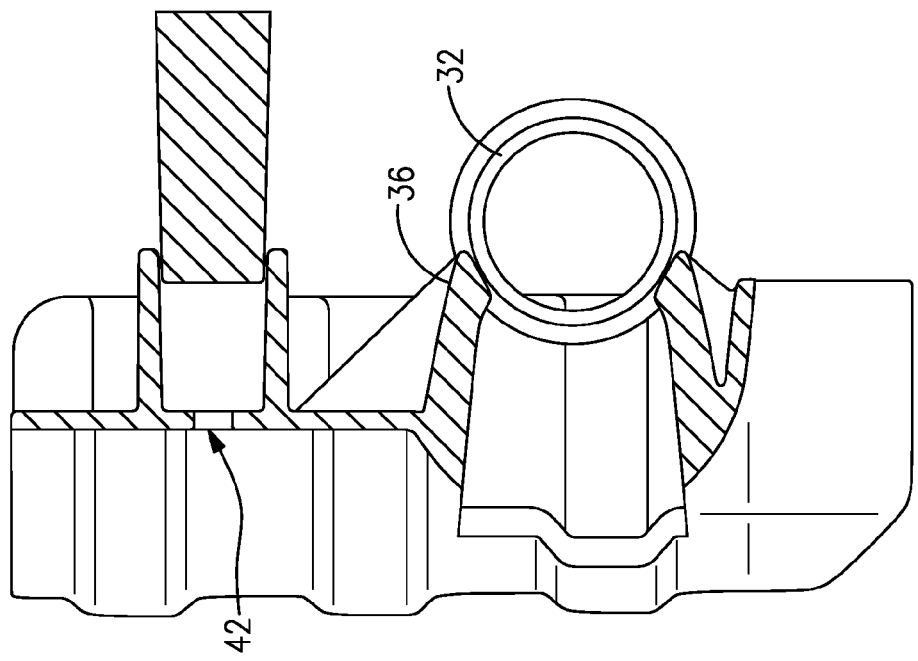
FIG. 4 is a cross-sectional view of the cover of FIG. 2.

The cover 24 may optionally include a pilot opening 42 (FIGS. 4-5) arranged relative to a corresponding pilot opening 44 formed in a boss 46 projecting from a static structure 48 adjacent the heat source 28. While the latches 34, 36 sufficiently retain the cover 24 relative to the conduit 32, if one of the latches 34, 36 becomes damaged, the pilot openings 42, 44 can receive a fastener to provide additional support for the cover 24. In other examples, a user may opt to provide a fastener in the openings 42, 44 for additional support.

In one example, the upper edge of the cover 24 adjacent the second portion 30 has a contour 50 (FIGS. 6A-6B) configured to allow access for a tool 52, such as a screw gun, to a flange 54 between the conduit 32 and the heater core 28. In this example, the contour 50 has a sunken portion, or indent, to allow passage of the tool 52. It should be understood that the contour 50 is not required in all examples. Other contours come within the scope of this disclosure.

Figure 7B:
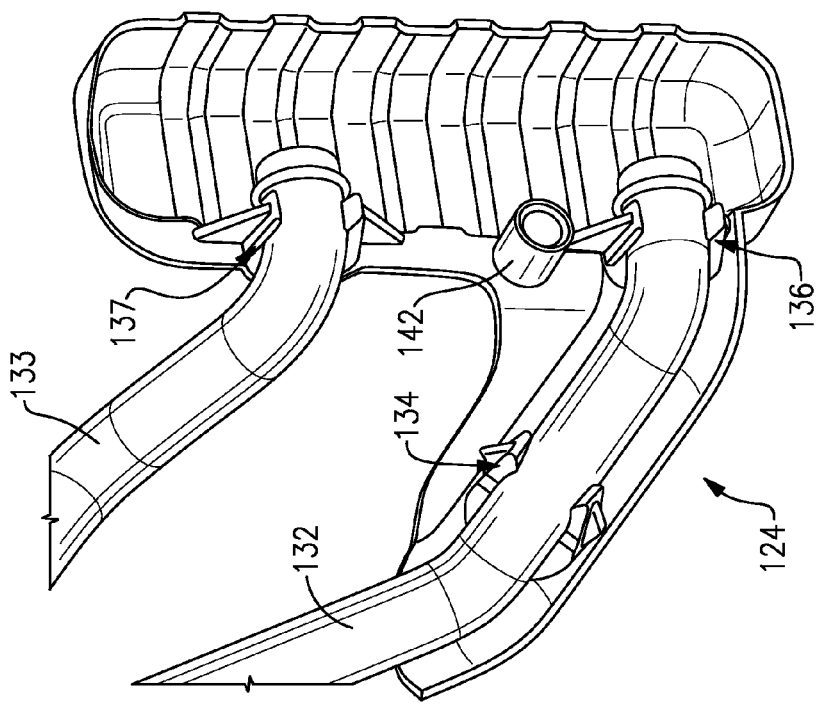
FIGS. 7A and 7B illustrate a second cover according to this disclosure.
Figure 7A:
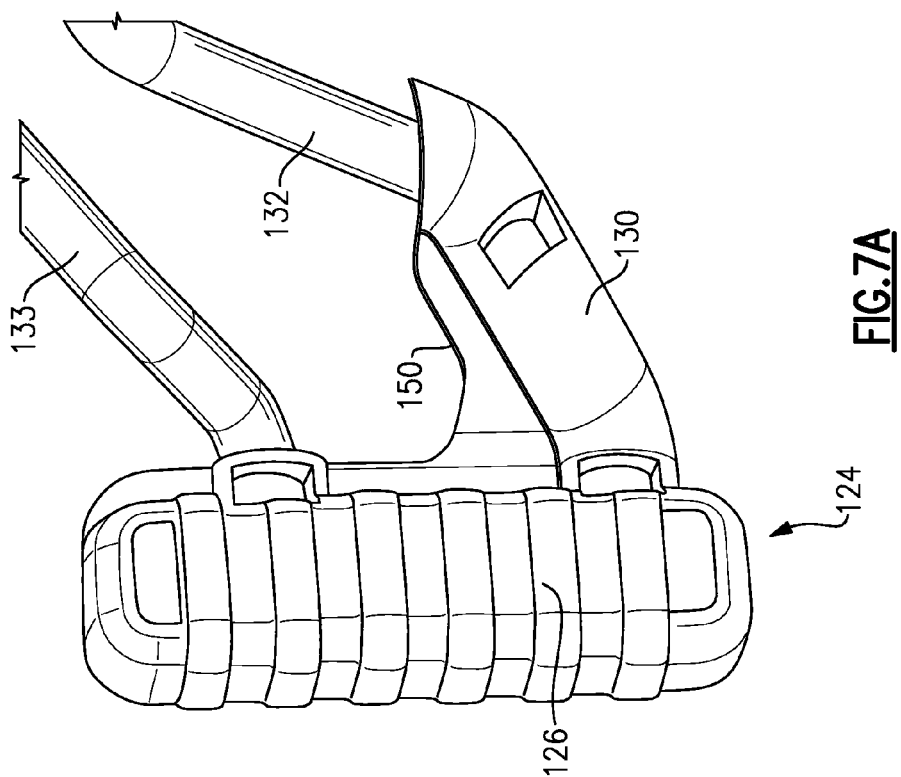

In an alternate embodiment, illustrated in FIGS. 7A-7B, the cover 124 includes a first portion 126 and a second portion 130. In this example, the first portion 126 of the cover 124 is larger than the first portion 26 in the embodiment of FIG. 2, and completely covers the heat source. Further, the second portion 130 includes three latches 134, 136, 137. As illustrated in FIG. 7B, the third latch 137 is arranged relative to an upper conduit 133, whereas the first and second latches 134, 136 are configured to engage a lower conduit 132 in much the same way as the latches 34, 36 in the prior example.

Figure 6C:
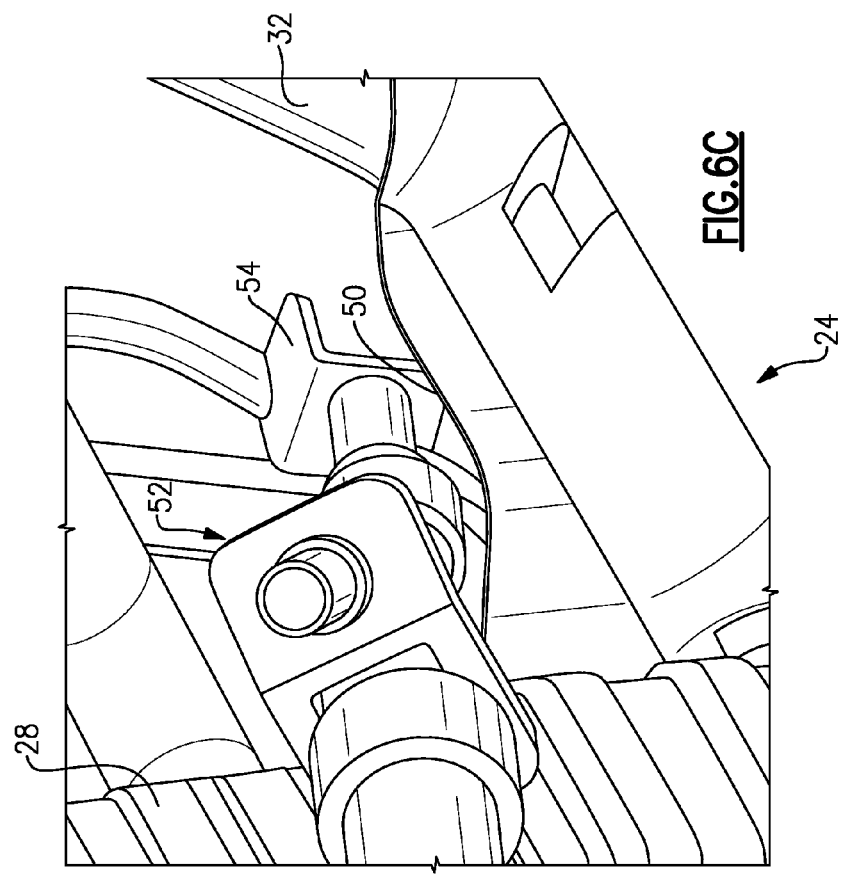
FIGS. 6A, 6B, and 6C illustrate the cover of FIG. 2 and, in particular, illustrates a tool access feature.
Figure 6A:
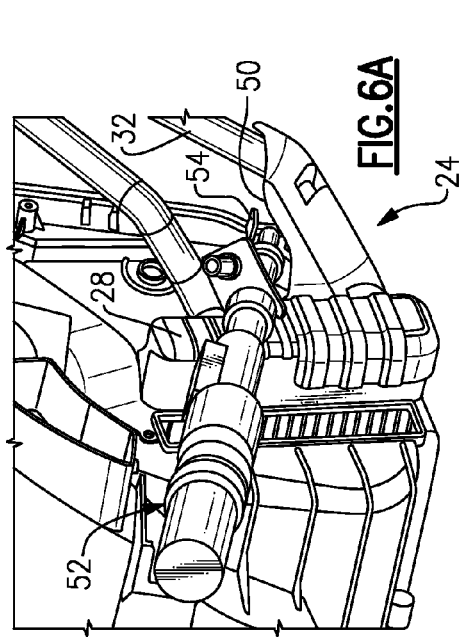
Figure 6B:
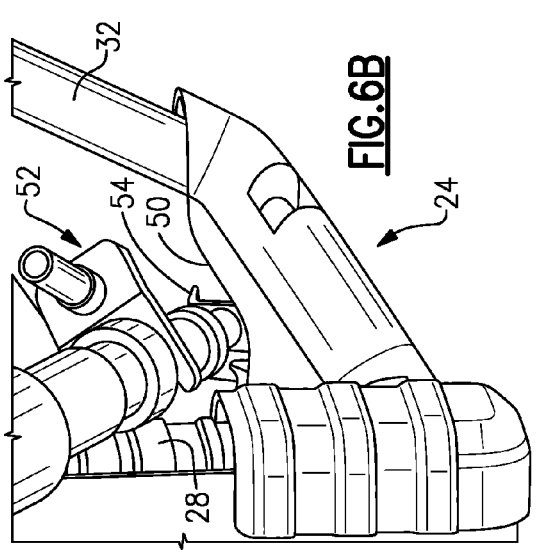

In this example, the second portion 130 includes an upper surface with a contour 150, which allows access for a tool, much as described in the same way as described in FIGS. 6A-6C.

While the first portion 26 of the cover 24 of FIG. 2 provides less coverage of the heat source 28 than the first portion 126, the location of the cover 24 near the bottom edge of the heat source 28 provides coverage in an area where protection is most needed. In either case, the covers 24, 124 protect a user from becoming exposed to the heat source 28. Further, there are no fasteners required to attach the covers 24, 124, which increases the ease of assembly.

It should be understood that the covers 24, 124 may be formed integrally as a single piece of plastic. This disclosure is not limited to plastic, however, and extends to other materials.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A cover for a heat source, comprising:
a first portion covering at least a portion of the heat source; and
a second portion including a first latch and a second latch, each of the first and second latches configured to engage a fluid conduit;
wherein the cover includes a pilot opening configured to align with a boss projecting from a structure adjacent the heat source; and
wherein a fastener extends through the pilot opening to connect the cover to the boss.

2. The cover as recited in claim 1, wherein the first and second latches have a contour corresponding to an outer contour of the fluid conduit.

3. The cover as recited in claim 2, wherein the first and second latches are generally U-shaped.

4. The cover as recited in claim 1, wherein the first and second latches each include first and second deflectable projections.

5. The cover as recited in claim 4, wherein, when the fluid conduit is engaged with the first and second latches, the first and second deflectable projections are biased toward the fluid conduit.

6. A cover for a heat source, comprising:
a first portion covering at least a portion of the heat source; and
a second portion including a first latch and a second latch, each of the first and second latches configured to engage a fluid conduit;
wherein a contour of the cover adjacent the second portion includes a sunken portion to allow tool access between the fluid conduit and heat source.

7. A cover for a heat source, comprising:
a first portion covering at least a portion of the heat source; and
a second portion including a first latch and a second latch, each of the first and second latches configured to engage a fluid conduit;
wherein the second portion of the cover includes first, second, and third latches; and
wherein the first and second latches engage a first fluid conduit, and the third latch engages a second fluid conduit.

8. The cover as recited in claim 1, wherein the cover is formed integrally as a single piece of material.

9. The cover as recited in claim 8, wherein the cover is plastic.

10. An assembly, comprising:
at least one fluid conduit;
a heat source fluidly coupled to the at least one fluid conduit; and
a cover including a first portion covering at least a portion of the heat source, and a second portion including a first latch and a second latch, each of the first and second latches configured to engage the at least one fluid conduit;
wherein the at least one fluid conduit includes a first fluid conduit and a second fluid conduit;
wherein the second portion of the cover includes first, second, and third latches; and
wherein the first and second latches engage a first fluid conduit, and the third latch engages a second fluid conduit.

11. The assembly as recited in claim 10, wherein the first and second latches each include first and second deflectable projections.

12. The assembly as recited in claim 11, wherein, when the at least one fluid conduit is engaged with the first and second latches, the first and second deflectable projections are biased toward the at least one fluid conduit.

13. The assembly as recited in claim 10, wherein:
the first, second, and third latches each include first and second deflectable projections; and
when the first fluid conduit is engaged with the first and second latches and the second fluid conduit is engaged with the third latch, the first and second deflectable projections are biased toward a respective one of the first and second fluid conduits.

* * * * *